United States Patent Office 2,999,841
Patented Sept. 12, 1961

2,999,841
STABILIZED ELASTOMER COMPOSITIONS
Ernest Csendes, Wilmington, Del., assignor to E. I. du Pont de Nemours and Company, Wilmington, Del., a corporation of Delaware
No Drawing. Filed Dec. 24, 1958, Ser. No. 782,622
6 Claims. (Cl. 260—45.95)

This invention is directed to an improved elastomer composition protected from degradation caused by heat aging, said composition containing the hereinafter described synergistic antioxidants.

It has long been known that heat aging is deleterious to the physical properties of cured elastomer stock. In particular, there is a sharp loss in tensile strength. Although antioxidants have customarily been incorporated, they have not provided sufficient protection.

It is, therefore, an object of the present invention to provide an improved elastomer composition wherein cured elastomer stock is protected from the deterioration of its physical properties which occurs during heat aging. It is another object to promote the activity of antioxidants which are useful in protecting cured elastomers from degradation during heat aging. It is a further object to provide a non-discoloring synergistic antioxidant combination to protect cured elastomer stock. It is a still further object to facilitate the use of non-discoloring phenolic antioxidants in elastomer stock.

These and other objects will become apparent in the following description and claims.

More specifically, the present invention is directed to a cured elastomer having incorporated therein a stabilizing amount of a synergistic combination of a phenolic antioxidant and a non-polymeric hydrocarbon polyol having at least three alcoholic hydroxyl groups as its sole substituents. The use of a filler is optional.

More particularly, the invention concerns an elastomer composition having improved stability toward heat aging, which compound comprises: 100 parts by weight of cured elastomer; 0.1 to 5 parts by weight of a phenolic antioxidant; 0.1 to 5 parts by weight of said polyol, there being present, as a matter of preference, for every part by weight of said phenolic antioxidant, at least 0.25 part by weight of said polyol.

In order to prepare the present novel composition, it is necessary to compound uncured elastomer stock in the usual manner with stearic acid, sulfur, conventional vulcanization accelerators, and the components of the described synergistic combination. The compounded stock is then cured by heating in the conventional manner of the trade.

The elastomer employed in the subject invention may be either natural rubber or synthetic rubber made from conjugated dienes. Representative examples of the latter are: polyisoprene having an essentially all-cis configuration, butadiene-styrene copolymer (known as SBR rubber), polychloroprene, butadiene-2,3-dimethyl butadiene copolymer, poly 2,3-dimethyl butadiene (known as methyl rubber), poly 2-chloro-3-methyl-butadiene-1,3, butadiene-dichlorostyrene copolymer, butadiene-monochlorostyrene copolymer, butadiene-alpha-methylstyrene copolymer, butadiene-p-methoxystyrene copolymer, butadiene-dimethylstyrene copolymer, butadiene-dimethoxystyrene copolymer, butadiene-alpha-methyl-p-methylstyrene copolymer, butadiene-p-phenyl styrene copolymer, isoprene-styrene copolymer, isoprene-butadiene copolymer, 2-isopropyl butadiene-styrene copolymer, 2-ethyl butadiene-styrene copolymer, 2-n-amyl-butadiene-styrene copolymer, polybutadiene, poly 2-ethyl butadiene, poly 2-isopropyl butadiene, poly 2-n-amyl butadiene, polycis-piperylene, butadiene-1-cyanobutadiene copolymer, isoprene-chloroprene copolymer, poly 2-fluorobutadiene, and butadiene-2-methyl-4-methoxy-5-isopropyl styrene copolymer. Butadiene-acrylonitrile copolymer (known as Perbunan), butadiene-methyl isopropenyl ketone copolymer, and chloroprene-methylisopropenyl ketone copolymer are representative examples of other elastomers which may be used.

The synergistic combination of this invention consists of two components: phenolic antioxidants, and, certain aliphatic polyhydroxy compounds. The antioxidants alone provide cured elastomer stock with only a limited measure of protection against heat aging. Furthermore, said aliphatic polyhydroxy compounds do not provide any significant antioxidant activity in cured gum stock. It was, therefore, entirely unexpected that a combination of these two reagents would provide an exceptionally enhanced measure of protection against, for example, heat aging and resulting discoloration.

The reasons for this synergistic activity are not understood. It is not possible to predict what aliphatic polyhydroxy compounds will be operable.

Fillers such as calcium carbonate, titanium dioxide, clay, and barium sulfate may be used with the phenolic antioxidants and the described aliphatic polyhydroxy compounds; other fillers such as silica, carbon black, and magnesium carbonate are less suitable, and, barium carbonate can only be used at low concentrations.

It is believed that any phenolic antioxidant may be used in this invention. By phenolic antioxidant is meant a phenolic compound, which, when added to elastomers in small proportions, retards atmospheric oxidation or the effect of oxidation. It is to be understood that the activity of some antioxidants may be promoted more effectively than that of other antioxidants by the combined presence of the selected aliphatic polyols.

Representative examples of antioxidants which may be employed are: 2,2'-methylenebis(6-tert-butyl-4-methyl phenol), 2,2'-methylenebis(6-tert-butyl-4-ethyl phenol), 2,2'-methylenebis [4-methyl-6-(1,1,3,3-tetramethyl)butyl phenol], 4,4'-bis(2-tert-butyl-5-methyl phenol)sulfide, 4,4'-butylidene-bis(2-tert-butyl-5-methyl phenol), 2,2'-methylenebis(4,6-dimethyl phenol), 2-tert-butyl-4-(4-tert-butyl phenyl)phenol, 2-tert-butyl-4-phenyl phenol, 2,6-dibenzyl-4-methyl phenol, 2-benzyl-4-methyl phenol, 2-benzyl-6-tert-butyl-4-methyl phenol, 2-benzyl-6-tert-butyl-4-ethyl phenol, 2,4-dimethyl-6-(1-methyl-1-cyclohexyl) phenol, 2,6-diisopropyl-4-methyl phenol, 2,4-dimethyl-6-isopropyl phenol, 2-tert-butyl-4,6-dimethyl phenol, 2-tert-butyl-4-methyl phenol, 2-(1,1,3,3-tetra-methyl butyl)-4-methyl phenol, 2,4,6-trimethyl phenol, 2,6-di-tert-butyl-4-methyl phenol, 2,6-di-tert-butyl-4-ethyl phenol, 4-phenyl phenol, 2,6-diisopropyl phenol, 2,6-di-tert-butyl-4-phenyl phenol, 2,6-di-tert-butyl-4(4-tert-butyl-phenyl)phenol, 2,5-di-tert-butyl-hydroquinone, 2,5-di-tert-amyl-hydroquinone, and alpha-conidendrine. Mixtures of the foregoing may be used.

There appears to be no criticality in the ratio of said aliphatic polyhydroxy compound to the antioxidant; however, better results are obtained when at least about 0.25 part of said polyol is present for each part by weight of the antioxidant; it is preferred to use about equal weights of both. In practice, their individual concentrations may range from about 0.1 to 5% by weight of the elastomer. Less satisfactory protection is gained when lower concentrations are used; higher concentrations are less economically attractive. The preferred concentration range is about 0.5–1.5% by weight of the elastomer.

If a filler is used, there is no criticality in the value of the weight ratio of the filler to either of the members of the synergistic combination. The best results for calcium carbonate, titanium dioxide, clay, and barium sulfate are obtained when about 50 to 100 parts are used for every 100 parts by weight of elastomer; levels as low as 5 parts of filler by weight may be utilized.

The compounded elastomer stock may be sulfur cured by techniques well known in the art. In general, about two parts of sulfur per 100 parts of elastomer is necessary to effect the cure in the presence of appropriate accelerators. Uncured white rubber stock may be easily compounded with the described synergistic combination without increased scorchiness. Vulcanization is accomplished by heating the compounded stock (usually in a mold) at a temperature of about 100 to 180° C. for a period ranging from about a half hour to several hours. It is to be understood that various modifications of this sulfur curing may be employed depending upon the stock. Various procedures and modifications of sulfur curing are more particularly described in Encyclopedia of Chemical Technology, Kirk and Orthmer, published by Inter-Science Encyclopedia Inc., New York, 1953, Volume 11, pages 892–927; Principles of High-Polymer Theory and Practice, Schmidt and Marlies, published by McGraw-Hill Book Co., New York, 1948, pages 556–566; and Industry and Technology of Rubber, Davis and Blake, published by Reinhold Publishing Corp., New York, 1937, Volume 74, Chapter 6.

Representative examples illustrating the present invention are as follows:

EXAMPLES

MASTERBATCH A

Masterbatch A is prepared by compounding 100 parts of pale crepe rubber with the following ingredients: 5 parts of zinc oxide, 13 parts of titanium dioxide, 67 parts of calcium carbonate (whiting), 1 part of stearic acid, 1 part of 2,2'-dithiobisbenzothiazole, 0.1 part of 2-mercaptobenzothiazole, and 2 parts of sulfur.

Example 1

A. Masterbatch A is further compounded, as shown in Table 1 below, to give Stocks 1–A, 1–B, and 1–C which are then cured at 142° C. for 30 minutes. The vulcanizates obtained are heat aged in air at 121° C. for 16 and 24 hours. The combination of sorbitol with the antioxidant 2,2'-methylene bis(6-tert-butyl-4-methyl phenol) provides much better protection than the antioxidant alone or the combination of the antioxidant with the sugar glucose (from which sorbitol is obtained by reduction). The data are shown in Table 1 below.

TABLE 1

| Stock | Additives, type | Conc'n.[1] | Protection of vulcanizate | | |
|---|---|---|---|---|---|
| | | | Intial $T_B$, p.s.i. | Percent retention of $T_B$ after heat aging at 121° C. for— | |
| | | | | 16 hrs. | 24 hrs. |
| 1–A | Antioxidant [2] | 1.0 | 2,800 | 52 | 41 |
| 1–B | Antioxidant [2] | 1.0 | 2,900 | 66 | 59 |
| | Sorbitol | 1.0 | | | |
| 1–C | Antioxidant [2] | 1.0 | 2,680 | 50 | 35 |
| | Glucose | 1.0 | | | |

[1] Parts/100 parts rubber.
[2] 2,2'-methylenebis(6-tert-butyl-4-methyl phenol).

B. When the procedure of Part A above is repeated except that sorbitol in Stock 1–B is replaced by an equal weight of any of the following polyols, essentially the same results are obtained:

(1) Mannitol
(2) Galactitol
(3) Talitol
(4) Iditol
(5) Allitol
(6) Altritol
(7) Gulitol
(8) Arabitol
(9) Ribitol
(10) Xylitol
(11) Lyxitol C. When the procedure of Part A above is repeated except that sorbitol in Stock 1–B is replaced by an equal weight of any of the following polyols, the improvement in retention of tensile strength is at least 60% of the improvement previously obtained by Stock 1–B:

(1) Erythritol
(2) Threitol
(3) 1,2,5,6-tetrahydroxyhexane

D. When the procedure of Part A above is repeated except that sorbital in Stock 1–B is replaced by an equal weight of glycerol, the improvement in retention of tensile strength is at least 30% of that improvement previously attained by Stock 1–B.

Example 2

A. Masterbatch A is further compounded as shown in Table 2 below to give Stocks 2–A, 2–B, and 2–C which are cured and tested as described in Example 1 above. Table 2 below shows the effect of heat aging on retention of tensile strength.

TABLE 2

| Stock | Additives | Conc'n.[1] | Protection of vulcanizate | | |
|---|---|---|---|---|---|
| | | | Intial $T_B$, p.s.i. | Percent retention of $T_B$ after heat aging at 121° C. for— | |
| | | | | 16 hrs. | 24 hrs. |
| 2–A | Antioxidant [2] | 1.0 | 3,200 | 58 | 47 |
| 2–B | Antioxidant [2] | 0.5 | 3,300 | 67 | 58 |
| | Sorbitol | 0.5 | | | |
| 2–C | Antioxidant [2] | 1.0 | 2,850 | 79 | 65 |
| | Sorbitol | 1.0 | | | |

[1] Parts additive per 100 parts of rubber.
[2] 2,2'-methylenebis(6-tert-butyl-4-methyl phenol).

Example 3

A. Masterbatch A is further compounded to give Stocks 3–A to 3–I which are then cured and tested by the procedures described above in Example 1. Table 3, which follows, shows the components added and the results of heat aging on the vulcanizates obtained.

TABLE 3

| Stock | Additives, type | Conc'n.[1] | Protection of vulcanizate | | |
|---|---|---|---|---|---|
| | | | Intial $T_B$, p.s.i. | Percent retention of $T_B$ after heat aging at 121° C. for— | |
| | | | | 16 hrs. | 24 hrs. |
| 3–A | 2,6-di-tert-butyl-p-cresol | 1.0 | 3,100 | 23 | 8 |
| 3–B | 2,6-di-tert-butyl-p-cresol | 1.0 | 3,100 | 54 | 46 |
| | Sorbitol | 1.0 | | | |
| 3–C | 2,6-di-tert-butyl-p-cresol | 0.5 | 3,300 | 47 | 36 |
| | Sorbitol | 0.5 | | | |
| 3–D | 6-tert-butyl-o-cresol | 1.0 | 3,020 | 23 | 7 |
| 3–E | 6-tert-butyl-o-cresol | 1.0 | 3,075 | 42 | 26 |
| | Sorbitol | 1.0 | | | |
| 3–F | 2-tert-butyl-6-methyl-p-cresol | 1.0 | 3,300 | ([2]) | 15 |
| 3–G | 2-tert-butyl-6-methyl-p-cresol | 0.5 | 3,350 | ([2]) | 42 |
| | Sorbitol | 0.5 | | | |
| 3–H | Alpha-conidendrin | 1.0 | 2,880 | ([2]) | 7 |
| 3–I | Alpha-conidendrin | 1.0 | 2,950 | ([2]) | 36 |
| | Sorbitol | 1.0 | | | |

[1] Parts additive/100 parts of rubber.
[2] Not determined.

When the procedure of Part A above is repeated except that sorbitol is replaced, where used, by an equal weight of any of the following polyols, essentially the same results are obtained:

(1) Mannitol
(2) Galactitol
(3) Talitol
(4) Iditol
(5) Allitol
(6) Gulitol
(7) Altritol
(8) Arabitol
(9) Ribitol
(10) Xylitol
(11) Lyxitol C. The procedure of Part A above is repeated except that soribitol is replaced, where used, by an equal weight of any of the following polyols. The improvement in retention of tensile strength is at least half that previously attained by the respective stocks.

(1) Erythritol
(2) Threitol
(3) 1,2,5,6-tetrahydroxyhexane

D. When the procedure of Part A above is repeated except that sorbitol is replaced, where used, by an equal weight of glycerol, the improvement in retention of tensile strength is at least a quarter that previously attained by the respective stocks.

*Example 4*

Eight masterbatches are prepared each having the following composition: 100 parts of pale crepe rubber, 5 parts of zinc oxide, 1 part of stearic acid, 1 part of 2,2'-dithiobisbenzothiazole, 0.1 part of 2-mercaptobenzothiazole, and 2 parts of sulfur. Each masterbatch is further compounded as shown below in Table 4 to give Stocks 4-A to 4-H.

Stocks 4-A to 4-H prepared above are cured at 142° C. for 30 minutes. The vulcanizates obtained are heat aged in air in a tube at 121° C. for 24 hours. Table 4 below gives the tensile strength data obtained.

TABLE 4

| Stock | Additives | | | | Protection of vulcanizate | |
|---|---|---|---|---|---|---|
| | Antioxidant,[1] parts | Sorbitol, parts | Filler | | Initial $T_B$, p.s.i. | Percent retention of $T_B$ after 24 hrs. at 121° C. |
| | | | Type | Parts | | |
| 4-A | 1 | 0 | CaCO$_3$ | 50 | 3,250 | 40 ⎫ 16 |
| 4-B | 1 | 1 | CaCO$_3$ | 50 | 3,200 | 56 ⎭ |
| 4-C | 1 | 0 | TiO$_2$ | 50 | 3,400 | 56 ⎫ 7 |
| 4-D | 1 | 1 | TiO$_2$ | 50 | 3,500 | 63 ⎭ |
| 4-E | 1 | 0 | Silica | 50 | 2,200 | 8 ⎫ 0 |
| 4-F | 1 | 1 | do | 50 | 2,250 | 8 ⎭ |
| 4-G | 1 | 0 | Clay | 50 | 2,900 | 38 ⎫ 26 |
| 4-H | 1 | 1 | do | 50 | 3,600 | 64 ⎭ |

[1] 2,2'-methylenebis(6-tert-butyl-p-cresol).

C. When the procedures of Parts A and B above are repeated except that barium sulfate is substituted for clay in the preparation of Stocks G and H, essentially the same results are obtained.

*Example 5*

A. Masterbatch A is further compounded to give Stocks 5-A and 5-B which are subsequently cured and heat aged by the procedure of Part A of Example 1 above. Table 5 below gives the compounding recipes and data showing the effect of heat aging on the vulcanizates obtained.

TABLE 5

| Stock | Additives, type | Conc'n.[1] | Protection of vulcanizate | | |
|---|---|---|---|---|---|
| | | | Initial $T_B$, p.s.i. | Percent retention of $T_B$ after heat aging at 121° C. for— | |
| | | | | 16 hrs. | 24 hrs. |
| 5-A | Antioxidant[2] | 1.0 | 3,100 | 65 | 44 |
| 5-B | Antioxidant[2] | 1.0 | 3,050 | 84 | 67 |
| | Trimethylol-propane | 1.0 | | | |

[1] Parts Additive/100 Parts of Rubber.
[2] 2,2'-methylenebis(6-tert-butyl-4-methylphenol).

B. When the procedure of Part A above is repeated except that trimethylolpropane is replaced by an equal weight of trimethylolethane, the retention of tensile strength of Stock 5-B after 24 hours heat aging at 121° C. is about 58%.

C. When the procedure of Part A above is repeated except that trimethylolpropane is replaced by an equal weight of pentaerythritol, the retention of tensile strength of Stock 5-B after 24 hours heat aging at 121° C. is about 53%.

*Example 6*

A. Masterbatches 6-A, 6-B, 6-C, and 6-D are prepared having the following composition: 100 parts of pale crepe rubber, 5 parts of zinc oxide, 1 part of stearic acid, 1 part of 2,2'-dithiobisbenzothiazole, 0.1 part of 2-mercaptobenzothiazole, and 2 parts of sulfur. They are further compounded, as shown in Table 6 below, to give Stocks 6-A, 6-B, 6-C, and 6-D which are then cured at 142° C. for 30 minutes. The vulcanizates obtained are heat aged in air at 121° C. for 24 hours. The data obtained are given in Table 6 below.

TABLE 6

| Stock | Additives | | Protection of vulcanizate | |
|---|---|---|---|---|
| | Type | Conc'n.[1] | Initial $T_B$ | Percent $T_B$ retained |
| 6-A | Antioxidant[2] | 1.0 | 3,825 | 13 |
| 6-B | Antioxidant[2] | 1.0 | 3,850 | 39 |
| | Sorbitol | 1.0 | | |
| 6-C | Antioxidant[2] | 1.0 | 3,950 | 60 |
| | Trimethylolpropane | 1.0 | | |
| 6-D | Antioxidant[2] | 1.0 | 4,087 | 47 |
| | Glycerol | 1.0 | | |

[1] Parts/100 parts rubber.
[2] 2,2'-methylenebis(6-tert-butyl-4-methyl phenol).

It is to be understood that polychloroprene may be stabilized more effectively against the deleterious effects of heat aging, such as embrittlement, when a combination of the above-named polyols and antioxidants is introduced prior to cure. As much as 5 parts of each may be used per 100 parts by weight of polychloroprene; lower concentrations such as 1 to 2 parts are generally enough. Fillers such as reinforcing furnace black and clay are optional. The curing agents familiar to those skilled to the polychloroprene art can be used. The following example is illustrative:

*Example 7*

Stocks 1A and 1B are made up having the following compositions:

| | 1-A | 1-B |
|---|---|---|
| Polychloroprene | 100 | 100 |
| Stearic acid | 0.5 | 0.5 |
| MgO | 4 | 4 |
| Suprex clay | 50 | 50 |
| ZnO | 5 | 5 |
| TiO$_2$ | 10 | 10 |
| Ethylene thiourea | 1 | 1 |
| Antioxidant[1] | 2 | 2 |
| Sorbitol | 0 | 1 |

[1] 2,2'-methylenebis(6-tert-butyl-4-methylphenol).

They are each cured for 15 minutes at 152° C. The vulcanizates 1-A and 1-B thereby obtained display the following physical properties:

| | 1-A | 1-B |
|---|---|---|
| $M_{300}$, p.s.i. | 800 | 850 |
| $T_B$, p.s.i. | 2,300 | 2,300 |
| $E_B$, percent | 620 | 600 |
| Hardness, Shore A | 67 | 69 |

Vulcanizates 1-A and 1-B are then heat-aged at 121° C,

After 22 days Vulcanizate 1–A becomes embrittled; Vulcanizate 1–B is not embrittled; after 14 days they display the following physical properties:

|  | 1–A | 1–B |
|---|---|---|
| $T_B$ | 2,300 | 2,200 |
| $E_B$ | 110 | 150 |
| Hardness, Shore A | 82 | 81 |

Heat aging is continued. After a total of 22 days Vulcanizate 1–A becomes embrittled. Vulcanizate 1–B, however, is satisfactory until a total of 28 days is reached.

When any of the following representative antioxidants are substituted for the 2,2'-methylenebis(6-tert-butyl-4-methylphenol) in the preceding examples, essentially the same results are achieved:

(1) 2,2' - methylenebis(6 - tert - butyl - 4 - ethyl phenol)
(2) 2,2' - methylenebis[4 - methyl - 6(1,1,3,3 - tetramethyl)butyl phenol]
(3) 4,4' - bis(2 - tert - butyl - 5 - methyl phenol)sulfide
(4) 4,4' - butylidene - bis(2 - tert - butyl - 5 - methyl phenol)
(5) 2,2' - methylenebis(4,6 - dimethyl phenol)
(6) 2 - tert - butyl - 4(4 - tert - butyl - phenyl)phenol
(7) 2-tert-butyl-4-phenyl phenol
(8) 2,6-dibenzyl-4-methyl phenol
(9) 2-benzyl-4-methyl phenol
(10) 2-benzyl-6-tert-butyl-4-methyl phenol
(11) 2-benzyl-6-tert-butyl-4-ethyl phenol
(12) 2,4 - dimethyl - 6 - (1 - methyl - 1 - cyclohexyl) phenol
(13) 2,6-diisopropyl-4-methyl phenol
(14) 2,4-dimethyl-6-isopropyl phenol
(15) 2-tert-butyl-4,6-dimethyl phenol
(16) 2-tert-butyl-4-methyl phenol
(17) 2 - (1,1,3,3 - tetramethyl - butyl) - 4 - methyl phenol
(18) 2,4,6-trimethyl phenol
(19) 2,6-di-tert-butyl-4-methyl phenol
(20) 2,6-di-tert-butyl-4-ethyl phenol
(21) 4-phenyl phenol
(22) 2,6-diisopropyl phenol
(23) 2,6-di-tert-butyl-4-phenyl phenol
(24) 2,6 - di - tert - butyl - 4(4 - tert - butyl - phenyl) phenol
(25) 2,5-di-tert-butyl-hydroquinone
(26) 2,5-di-tert-amyl-hydroquinone Any of the elastomers set forth in this specification may be substituted in any one of the preceding examples 1–7 to obtain substantially the same results as those achieved with rubber.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A cured elastomer selected from the group consisting of natural rubber and synthetic rubber made from conjugated dienes, said elastomer having incorporated therein a stabilizing amount of a phenolic antioxidant and a non-polymeric hydrocarbon polyol, said polyol being a saturated acylic aliphatic compound containing 3 to 6 carbon atoms and having at least 3 alcoholic hydroxyl groups as its sole substituents, each of said hydroxyl groups being on a different carbon atom, said phenolic antioxidant and said polyol being present in an amount within the range of 0.1 to 5 parts by weight per 100 parts of said elastomer.

2. The elastomer of claim 1 wherein for every part by weight of phenolic antioxidant there is at least 0.25 part by weight of said polyol.

3. The elastomer of claim 1 wherein said non-polymeric hydrocarbon polyol is sorbitol.

4. A cured elastomer selected from the group consisting of natural rubber and synthetic rubber made from conjugated dienes, said elastomer having incorporated therein a stabilizing amount of 2,6-di-tert-butyl-4-phenyl phenol and sorbitol, said 2,6-di-tert-butyl-phenyl phenol and said sorbitol being present in an amount within the range of 0.1 to 5 parts by weight per 100 parts of said elastomer.

5. A stabilizing composition in which the stabilizing component consists of at least one phenolic antioxidant and an non-polymeric hydrocarbon polyol, said polyol being a saturated acyclic aliphatic compound containing 3 to 6 carobn atoms and having at least 3 alcoholic hydroxyl groups as its sole substituents, each of said hydroxyl groups being on a different carbon atom, said phenolic antioxidant and said polyol being present in an amount within the range of 0.1:5.0 to 5.0:0.1 parts by weight.

6. A stabilizing composition in which the stabilizing component consists of 2,6-di-tert-butyl-4-phenyl phenol and sorbitol, said 2,6-di-tert-butyl-4-phenyl phenol and said sorbitol being present in the amount within the range of 0.1:5.0 to 5.0:0.1 parts by weight.

References Cited in the file of this patent

UNITED STATES PATENTS

| 2,721,185 | Schulze et al. | Oct. 18, 1955 |
| 2,734,881 | Lally et al. | Feb. 14, 1956 |